US009360374B2

United States Patent
Lin et al.

(10) Patent No.: US 9,360,374 B2
(45) Date of Patent: Jun. 7, 2016

(54) LASER ADJUSTMENT DEVICE, LASER ADJUSTMENT SYSTEM AND LASER ADJUSTMENT METHOD FOR INFRARED RADIATION THERMOMETER THEREOF

(71) Applicant: RADIANT INNOVATION INC., Hsinchu (TW)

(72) Inventors: Tseng-Lung Lin, Hsinchu County (TW); An-Chin Lai, Taichung (TW)

(73) Assignee: Radiant Innovation Inc., Hsinchu (TW)

( * ) Notice: Subject to any disclaimer, the term of this patent is extended or adjusted under 35 U.S.C. 154(b) by 470 days.

(21) Appl. No.: 13/974,218

(22) Filed: Aug. 23, 2013

(65) Prior Publication Data
US 2015/0055674 A1   Feb. 26, 2015

(51) Int. Cl.
G01J 5/02       (2006.01)
G01J 5/08       (2006.01)
G01K 15/00      (2006.01)
G01J 5/00       (2006.01)

(52) U.S. Cl.
CPC ............. G01J 5/0275 (2013.01); G01J 5/0205 (2013.01); G01J 5/089 (2013.01); G01J 5/0896 (2013.01); *G01J 2005/0048* (2013.01)

(58) Field of Classification Search
CPC .............. G01K 15/00; G01J 5/02; G01J 5/08
USPC .................................. 600/474, 549; 702/135
See application file for complete search history.

(56) References Cited

U.S. PATENT DOCUMENTS

| 5,836,694 A * | 11/1998 | Nguyen | G01J 5/08 250/491.1 |
| 6,123,453 A * | 9/2000 | Hollander | G01J 5/02 250/491.1 |
| 6,196,714 B1 * | 3/2001 | Bellifemine | G01J 5/04 374/120 |
| 8,246,245 B2 * | 8/2012 | Lin | G01J 5/0265 374/120 |
| 2004/0196888 A1 * | 10/2004 | Musbach | G01J 5/02 374/120 |
| 2005/0031013 A1 * | 2/2005 | Blakeley | G01J 5/02 374/120 |
| 2008/0144696 A1 * | 6/2008 | Bruggeman | F24H 9/2071 374/121 |
| 2010/0195697 A1 * | 8/2010 | Hollander | G01J 5/02 374/121 |

FOREIGN PATENT DOCUMENTS

CN   102155993 A  *  8/2011  ............ G01J 5/0265

* cited by examiner

*Primary Examiner* — Gail Kaplan Verbitsky
(74) *Attorney, Agent, or Firm* — Rosenberg, Klein & Lee

(57) ABSTRACT

The invention is directed to a laser adjustment device, a laser adjustment system and a laser adjustment method for an infrared thermometer. The laser adjustment device of the present invention includes a first adjustment seat and a second adjustment seat. The first adjustment seat includes a base, a fixing portion, a first adjustment portion, a second adjustment portion, and a first pivot portion. The second adjustment seat includes a connecting portion, a receiving portion and a second pivot portion. The first adjustment seat is pivoted about the first pivoting portion via the first adjustment portion, a first elastic member, and a first adjustment member. The second adjustment seat is pivoted about the second pivot portion via the second adjustment portion, a second elastic member, and a second adjustment member.

8 Claims, 9 Drawing Sheets

LASER ADJUSTMENT DEVICE, LASER ADJUSTMENT SYSTEM AND LASER ADJUSTMENT METHOD FOR INFRARED RADIATION THERMOMETER THEREOF

BACKGROUND OF THE INVENTION

1. Field of the Invention

The present disclosure relates to an adjustment device; in particular, to a laser adjustment device, a laser adjustment system and a laser adjustment method for infrared radiation thermometer.

2. Description of Related Art

Traditional contact thermometers such as a mercury-in-glass thermometer and an electronic thermometer no longer satisfy demands of the users. Therefore, a temperature measuring method and device that is precise, rapid, easy to use, easy to read, harmless and user-friendly is being pursued. Thermometers can be generally classified as contact thermometers or non-contact thermometers. Due to its wide range of applications, non-contact thermometers have become mainstream in modern technological developments for temperature measurement. The most common non-contact thermometers are industrial infrared thermometers, fiber optical thermometers, thermal imagers and infrared thermometers for human ears. Non-contact thermometers measuring infrared radiation have the abovementioned advantages, and therefore are progressively getting more attention and being developed.

However, the sensing area and the distance of infrared thermometers becoming widely used are directly proportional. The sensing area is typically called field of view and is usually represented by the ratio distance:spot size (D:S). Since the naked eye cannot pinpoint the sensing area of an infrared thermometer, most infrared thermometers are equipped with sights so the user can know the region of the sensing area. However, sights often belong to high-price infrared thermometers and are not commonly applied. In comparison, medium to low priced infrared thermometers use laser sights, which are laser units fixed on the infrared thermometers to create a laser light point informing the user of the center point of the temperature sensing area. However, due to considerations of production and cost as well as under the influence of difficult conditions for controlling precision of infrared thermometer assembly, typical laser modules produced in the market emit laser beams with a range of error of plus or minus 5 degrees. The sensing range of an infrared thermometer cannot be identified by the naked eye. Therefore, users cannot identify the correct sensing region, and consequently often obtains incorrect temperature values.

As such, providing a laser adjustment for infrared thermometers such that the laser adjustment device can quickly and precisely adjust to the correct position, thereby overcoming the abovementioned problem, is an important topic for people in the industry.

SUMMARY OF THE INVENTION

The object of the present disclosure is to provide a laser adjustment device, a laser adjustment system and a laser adjustment method for an infrared thermometer, such that the laser module can be quickly and precisely adjusted to the correct position by the laser adjustment device.

In order to achieve the aforementioned objects, an embodiment of the present disclosure provides a laser adjustment device for an infrared thermometer. The infrared thermometer has a support portion. The laser adjustment device includes: a first adjustment seat and a second adjustment seat. The first adjustment seat has a base, a fixing portion connected to the base, a first adjustment portion connected to the base, a second adjustment portion connect to the base, and a first pivot portion disposed on the base. The fixing portion is disposed on the support portion. The first adjustment portion is proximal to the fixing portion. The first pivot portion is pivotally connected to the support portion. The second adjustment seat has a connecting portion connected to the base, a receiving portion extended from the connecting portion, and a second pivot portion connected to the connecting portion. A laser module is accommodated in the receiving portion. The laser module has an emission end for emitting a laser beam. The second pivot portion is connected to the first adjustment seat. The first adjustment seat is rotated about the first pivot portion by the first adjustment portion, a first elastic member disposed between the infrared thermometer and the first adjustment portion, and a first adjustment member passing through the first adjustment portion and connected to the infrared thermometer. The second adjustment seat is rotated about the second pivot portion by the second adjustment portion, a second elastic member connected to the base and the connecting portion, and a second adjustment member passing through the second adjustment portion and connected to the connecting portion.

In order to achieve the aforementioned objects, an embodiment of the present disclosure provides a laser adjustment system for an infrared thermometer including: a working table, an infrared thermometer and an electronic device. The working table has a platform, a first-axis mobile unit, a second-axis mobile unit, and a drive unit. The first-axis mobile unit provides movement of the platform in a first direction. The second-axis mobile unit provides movement of the platform in a second direction. The drive unit drives the first-axis mobile unit and the second-axis mobile unit. The infrared thermometer is disposed on the platform. The infrared thermometer has an infrared temperature sensing unit, and at least one laser adjustment device proximal to the infrared temperature sensing unit. A laser module is disposed on each of the laser adjustment devices. The infrared temperature sensing unit is used for measuring the temperature of a predetermined area on a target-image adjustment device and obtains respective temperature data. Each of the laser modules emits one laser beam to the target-image adjustment device forming a laser spot and obtaining a respective position datum. The electronic device includes a microprocessor unit, a comparison unit, and a control unit. The control unit and the target-image adjustment device are connected. The electronic device receives the temperature data and creates via the microprocessor unit a sensing-area image marking the sensing area. The electronic device receives the position data and via the microprocessor unit creates a laser image marking the region of the laser spots. The comparison unit measures the distances between the sensing-area image and the laser spot in the first direction and the second direction. The control unit connected to the drive unit is used for adjusting the laser beam to move along the first direction and the second direction.

In order to achieve the aforementioned objects, an embodiment of the present disclosure provides a laser adjustment method for an infrared thermometer, including the following steps: (a) disposing an infrared thermometer on the platform, (b) providing an target-image adjustment device and setting the D:S ratio, (c) auto-target and confirming the heat source center, (d) initiating laser module and (e) comparison and correction. The step of disposing an infrared thermometer on the platform includes: providing a working table having a platform movable in a first direction and a second direction, disposing on the platform an infrared thermometer having an infrared temperature sensing unit, at least one laser adjustment device proximal to the infrared temperature sensing unit, and a laser module disposed on each of the laser adjustment device. The step of providing a target-image adjustment device and setting the D:S ratio includes: providing a target-image adjustment device to be measured by the infrared thermometer, wherein the infrared thermometer and the target-image adjustment device have a sensing distance therebetween, the sensing area of the infrared temperature sensing unit has a sensing diameter; setting the sensing distance to sensing diameter ratio in an electronic device having a microprocessor unit, a comparison unit and a control unit. The step of auto-target and confirming the heat source center includes: initiating the infrared thermometer and through the infrared temperature sensing unit measure the temperature in a predetermined area on the target-image adjustment device and obtain a plurality of corresponding temperature data, sending the temperature data obtained from measurement to the electronic device and through the microprocessor unit directs the infrared thermometer at the center of the heat source and create a sensing-area image marking the sensing area, and sending the sensing-area image to the comparison unit. The step of initiating laser module includes: initiating the laser module to emit a laser beam to the predetermined area forming a laser spot and obtaining a corresponding position datum, sending the position datum to the electronic device and through the microprocessor unit create a laser image marking the laser spot, and sending the laser image to the comparison unit. The step of comparison and correction includes: through the comparison unit measuring the distances between the sensing-area image and the laser spot in the first direction and the second direction, and through the control unit adjusting the laser adjustment device such that the laser spot is close to the sensing diameter.

The present disclosure has the following advantages. The present invention provides a laser adjustment device, a laser adjustment system and a laser adjustment method for an infrared thermometer, which through a design of "a first adjustment seat and a second adjustment seat" and "the comparison unit measuring the distances between the sensing-area image and the laser spot in the first direction and the second direction, through the control unit adjust the laser adjustment device," quickly and precisely adjust the laser module through the laser adjustment device to the correct position.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

First Embodiment

Figure 1A:
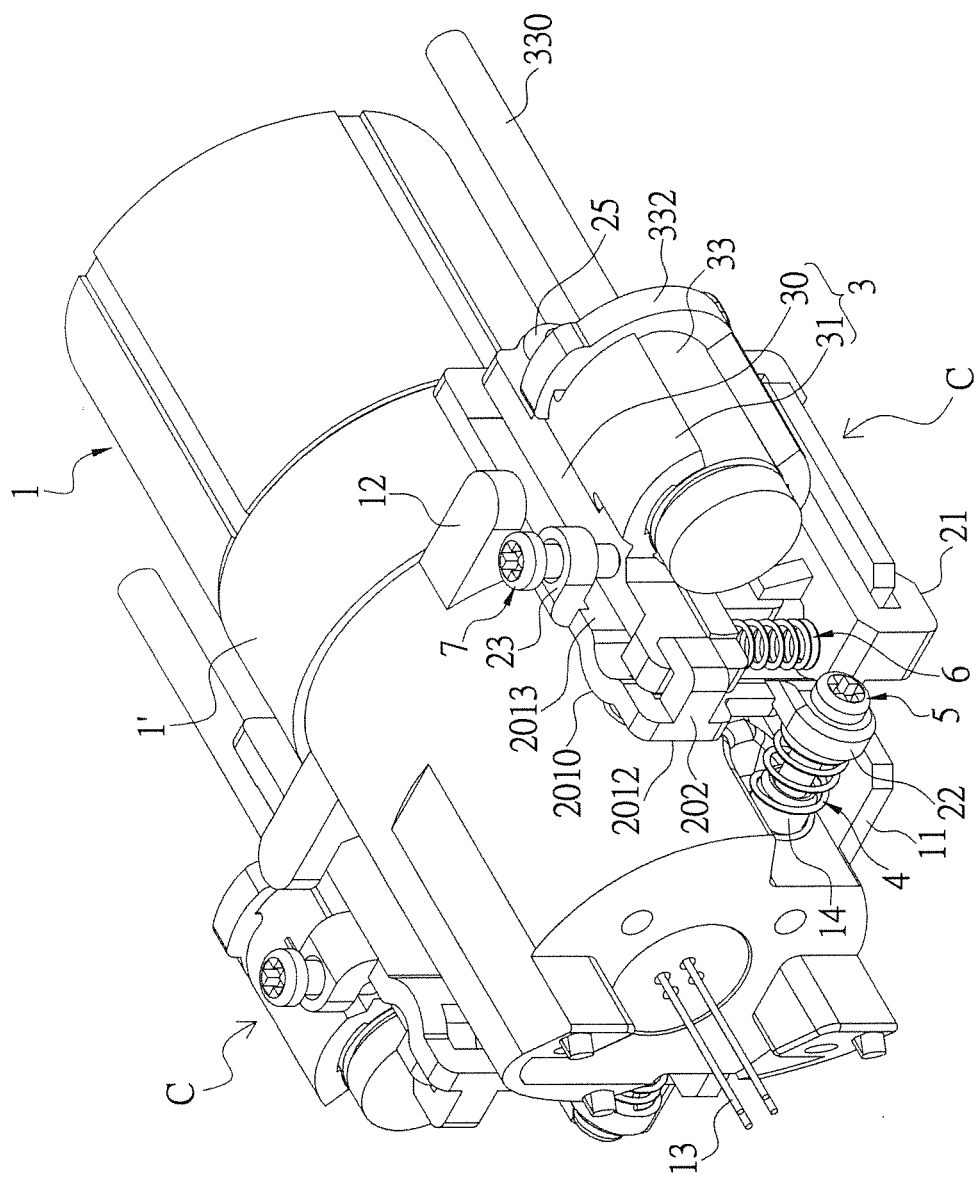
FIG. 1A is a perspective view of a first embodiment of the present disclosure.
Figure 1B:
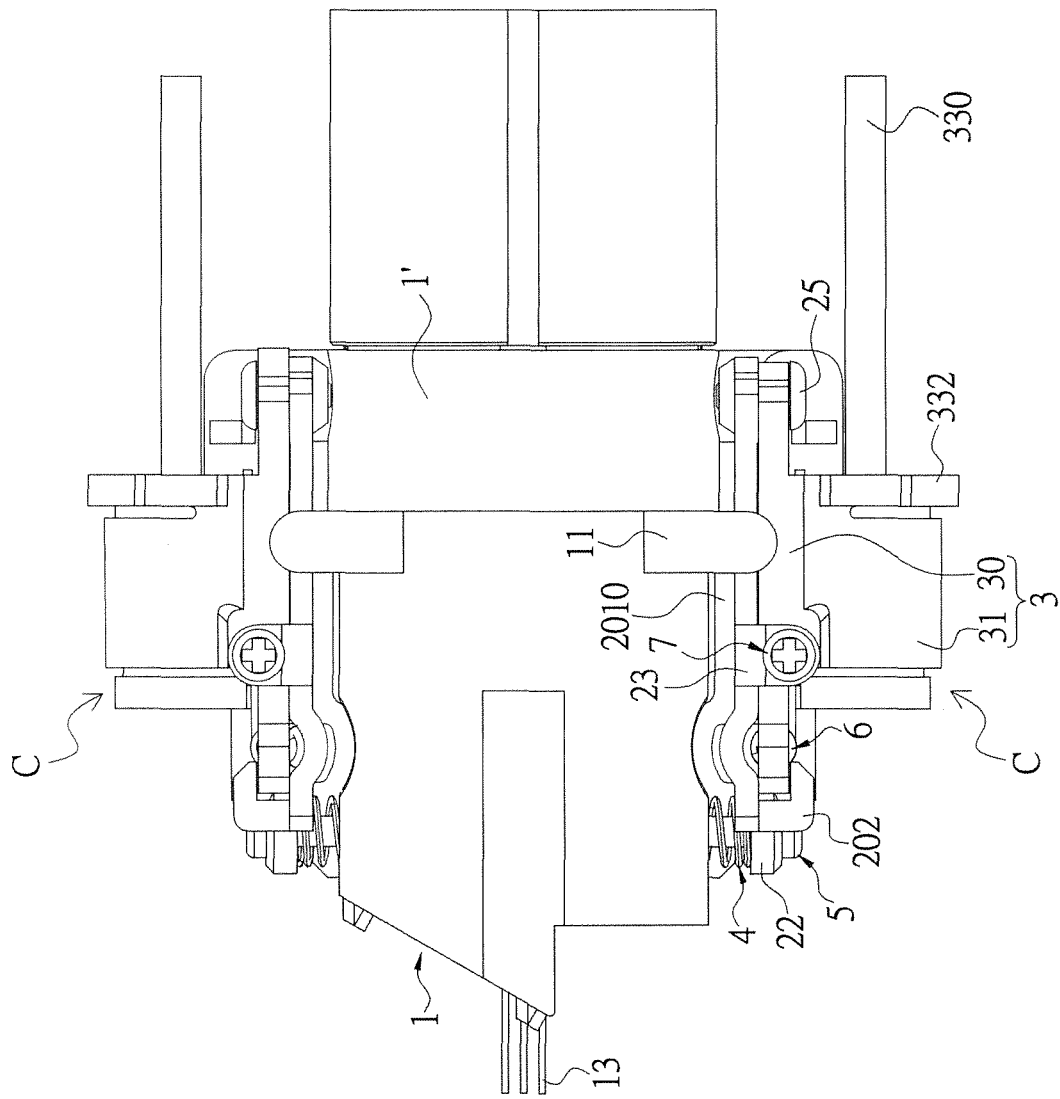
FIG. 1B is a schematic side view of the first embodiment of the present disclosure.
Figure 2:
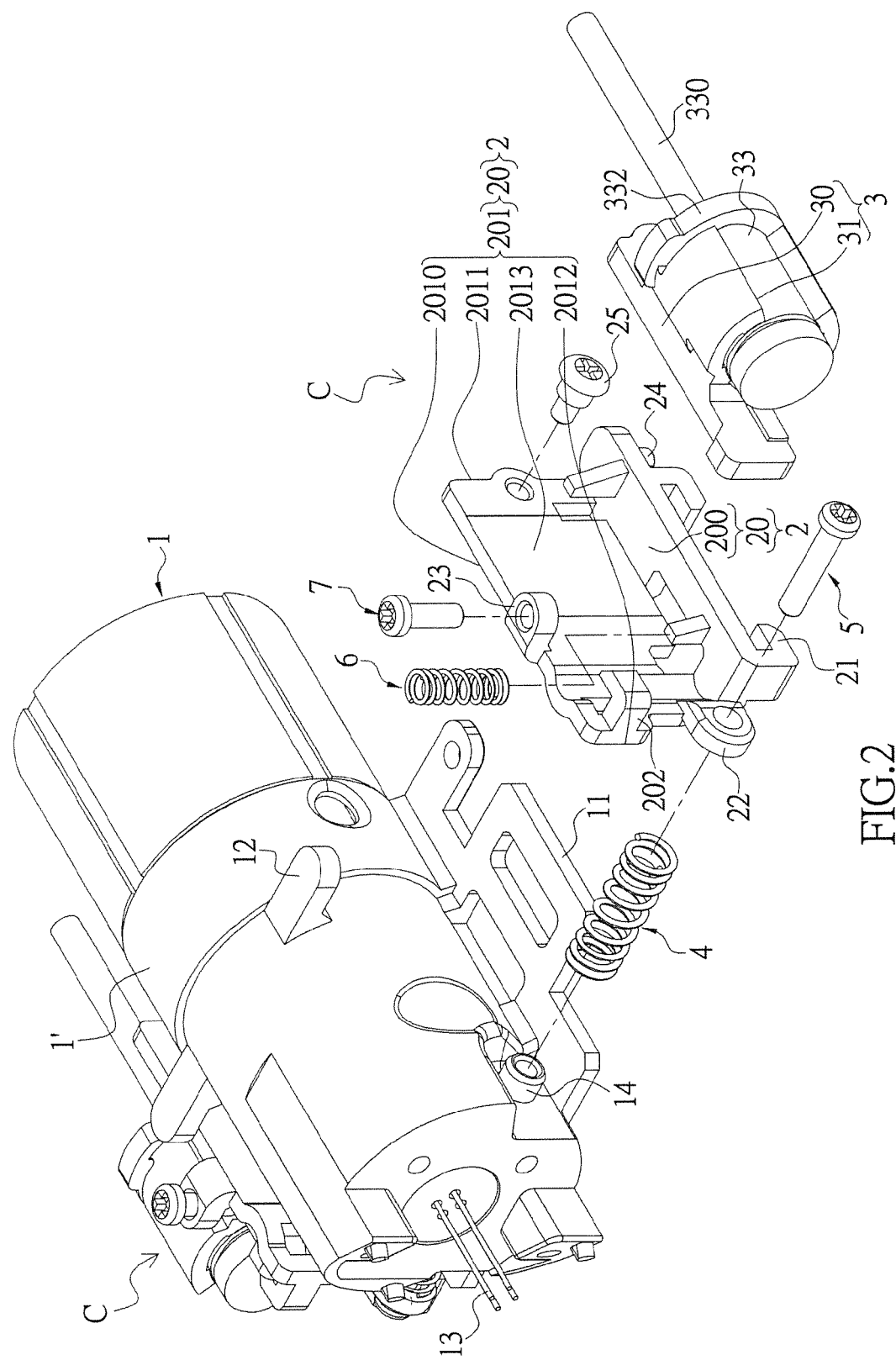
FIG. 2 is an exploded view of the first embodiment of the present disclosure.

FIG. 1A is a perspective view of a laser adjustment device C. FIG. 1B is a side view of the laser adjustment device C. FIG. 2 is an exploded view of the laser adjustment device C. As can be seen from the abovementioned figures, the first embodiment of the present disclosure provides a laser adjustment device C for an infrared thermometer 1, the infrared thermometer 1 has a support portion 11, and the laser adjustment device C includes a first adjustment seat 2 and a second adjustment seat 3. One laser adjustment device C is described in the first embodiment of the present disclosure. Generally, the infrared thermometer 1 has one or two laser adjustment devices C disposed on two sides of the infrared temperature sensing unit 13.

Referring to FIG. 1A to FIG. 2, the first adjustment seat 2 has a base 20, a fixing portion 21, a first adjustment portion 22, a second adjustment portion 23, and a first pivot portion 24. The support portion 11 extends from the surface 1' of the infrared thermometer 1 for supporting the laser adjustment device C.

Referring to FIG. 1A to FIG. 2, the base 20 includes: a base seat 200 and an extension portion 201 connected to the base seat 200. The extension portion 201 extends from the base seat 200 to the direction away from the support portion 11. Specifically, the base 20 is an L-shaped structure. The extension portion 201 has a top edge face 2010, a first lateral edge face 2011, a second lateral edge face 2012, and a lateral surface 2013. The first lateral edge face 2011 is opposite the second lateral edge face 2012. The lateral surface 2013 is adjacent to the top edge face 2010, the first lateral edge face 2011, and the second lateral edge face 2012.

Referring to FIG. 1A to FIG. 2, the fixing portion 21 is disposed at the bottom portion of the base 20 for fixing the first adjustment seat 2 on the support portion 11. In the present embodiment, the fixing portion 21 extends from the base seat 200 to the direction away from the extension portion 201, and wraps around the two ends of the support portion 11.

Referring to FIG. 1A to FIG. 2, the first adjustment portion 22 is disposed on the lateral surface 2013 of the extension portion 201. In other words, the first adjustment portion 22 is connected to the base seat 200 and the extension portion 201, and the first adjustment portion 22 is proximal to the fixing portion 21. The first adjustment portion 22 extends from the lateral surface 2013 to the direction away from the base seat 200, and has a fixing hole for providing fixture.

Referring to FIG. 1A to FIG. 2, the second adjustment portion 23 is disposed on the top edge face 2010 of the extension portion 201. The second adjustment portion 23 extends from the top edge face 2010 to the direction away from the infrared thermometer 1, and has a fixing hole for providing fixture.

Referring to FIG. 1A to FIG. 2, the first pivot portion 24 is disposed on the base 20 and is proximal to the fixing portion 21, mainly for pivoting the first adjustment seat 2 on the support portion 11. In the present embodiment, the first pivot portion 24 is a cylindrical structure protruding from the base seat 200 in the direction away from the extension portion 201.

It should be emphasized that the first adjustment seat 2 is rotated about the first pivot portion 24 by the first adjustment portion 22, a first elastic member 4, and a first adjustment member 5. Specifically, when the user adjusts the first adjustment member 5 to compress or decompress the first elastic member 4, the laser beam 330 is adjusted in the horizontal direction. The first elastic member 4 is disposed between the infrared thermometer 1 and the first adjustment portion 22. The first adjustment member 5 passes through the first adjustment portion 22 and is connected to the infrared thermometer 1. In the present embodiment, the first elastic member 4 is a coil spring, the first adjustment member 5 is a screw fixed to a surface of the infrared thermometer 1, and the surface of the infrared thermometer 1 has a screw hole corresponding to the first adjustment member 5.

However, the above descriptions of the base 20, the fixing portion 21, the first adjustment portion 22, the second adjustment portion 23, and the first pivot portion 24 are merely exemplary samples and the present disclosure is not limited thereto.

Moreover, referring to FIG. 1A to FIG. 2, the second adjustment seat 3 has a connecting portion 30, a receiving portion 31, and a second pivot portion 32. The connecting portion 30 contacts the lateral surface 2013 of the base 20. The receiving portion 31 extends from the connecting portion 30 to the direction away from the infrared thermometer 1 and has a shape similar to that of the laser module 33. In the present embodiment, the receiving portion 31 has a shape of a cylinder for accommodating a laser module 33. The laser module 33 has an emitting end 332 for emitting a laser beam 330. A lateral face of the second pivot portion 32 is connected to the connecting portion 30. The second pivot portion 32 is connected to the first adjustment seat 2 and has a fixing hole for providing fixture with a pivot member 25. However, in the present embodiment, the pivot member 25 is a fixture screw which can be rotated.

It should be emphasized that the second adjustment seat 3 of the present disclosure is rotatable about the second pivot portion 32 by the second adjustment portion 23, the second elastic member 6, and a second adjustment member 7. Specifically, when the user adjusts the second adjustment member 7 to compress or decompress the second elastic member 6, the laser beam 330 is adjusted in the vertical direction. The second elastic member 6 is connected to the base 20 and the connecting portion 30. The second adjustment member 7 passes through the second adjustment portion 23 and is connected to the connecting portion 30. In the present embodiment, the second elastic member 6 is a coil spring, and the second adjustment member 7 is a screw.

Referring to FIG. 1A to FIG. 2, the infrared thermometer 1 has a positioning portion 12 extending from its surface 1'. In the present embodiment, the positioning portion 12 is a protruding structure, and the base 20 is disposed between the positioning portion 12 and the support portion 11 such that the positioning portion 12 can securely fix the base 20.

A protruding portion 202 for fixing the connecting portion 30 is disposed on the lateral surface 2013 proximal to the second edge face 2012. A prism (not shown in the figures) for refracting the laser beam 330 into a plurality of laser beams 330 is disposed at the emitting end 332 of the laser module 33. The prism and the laser module 33 have a common axis. The plurality of laser beams 330 forms the signal point of the sensing area of the infrared thermometer 1.

However, the above descriptions of the receiving portion 31, the second pivot portion 32, the pivot member 25 and the positioning portion 12 are merely exemplary samples and the present disclosure is not limited thereto.

Second Embodiment

Figure 3:
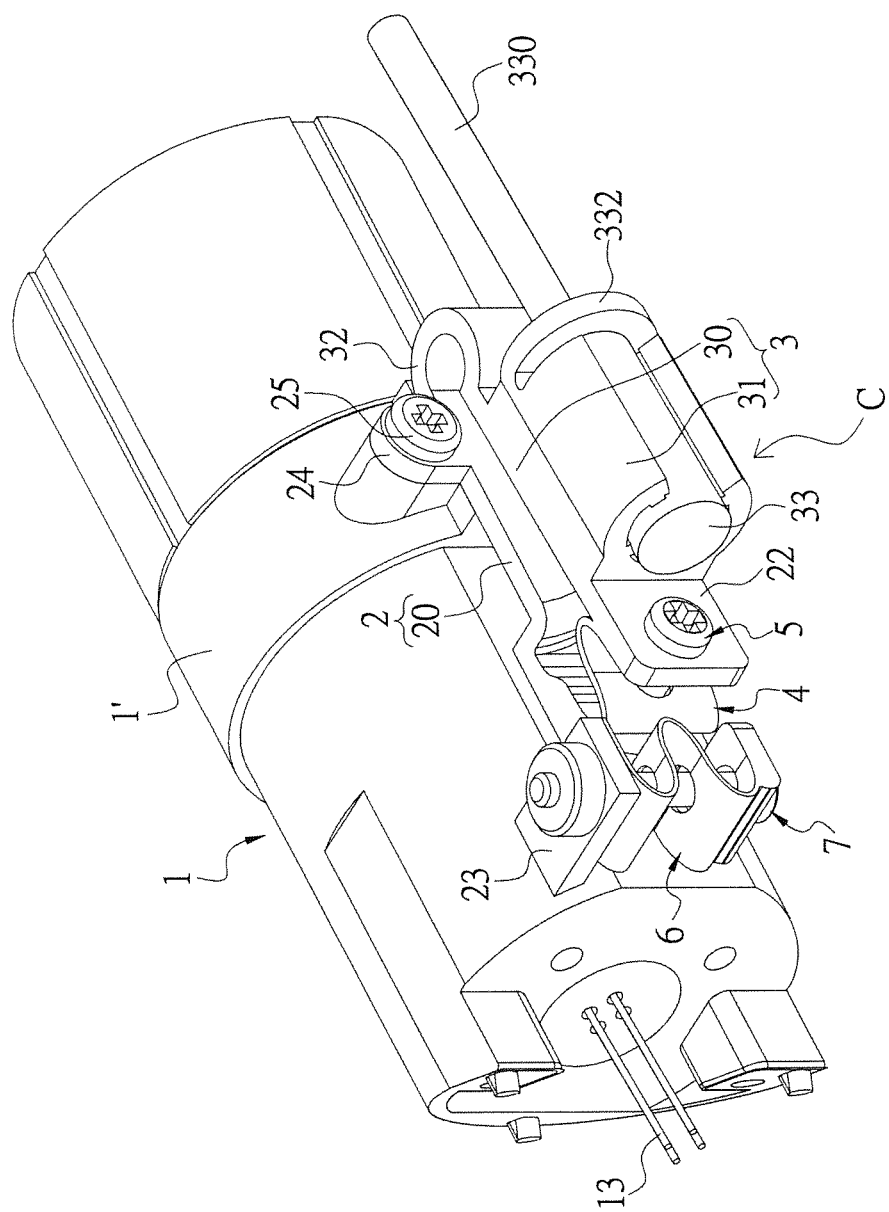
FIG. 3 is a perspective view of a second embodiment of the present disclosure.
Figure 4:
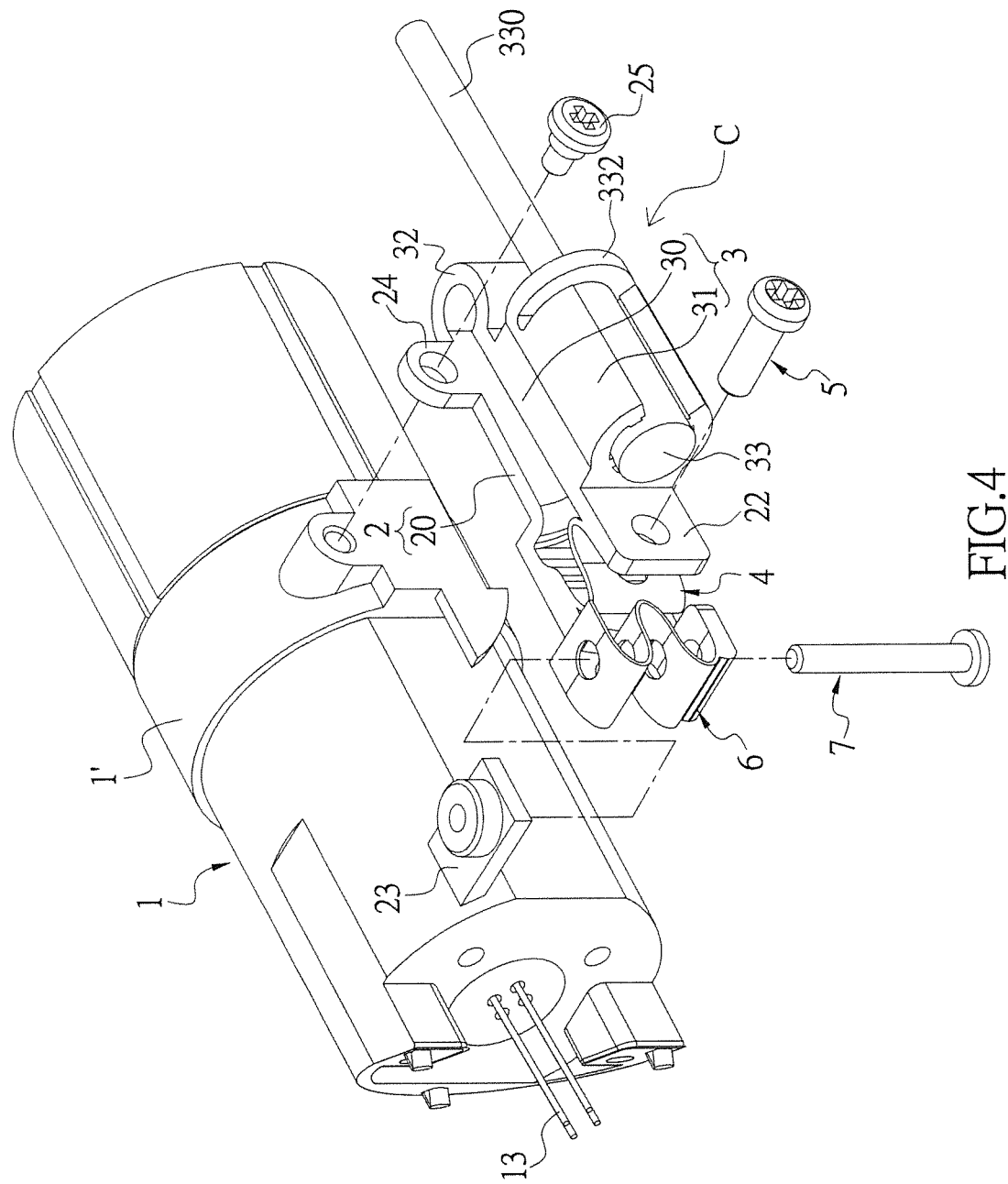
FIG. 4 is an exploded view of the second embodiment of the present disclosure.

FIG. 3 is a perspective view of a laser adjustment device C. FIG. 4 is an exploded view of the laser adjustment device C. Comparing FIG. 3 to FIG. 1A, and FIG. 4 to FIG. 2, it can be seen that the second embodiment of the present disclosure provides a laser adjustment device C for an infrared thermometer 1. The laser adjustment device C includes a first adjustment seat 2 and a second adjustment seat 3.

The main difference between the second embodiment and the first embodiment is that in the second embodiment, the first adjustment seat 2, the second adjustment seat 3, the first elastic member 4 and the second elastic member 6 are integrally formed as one body. The first adjustment seat 2 is connected to the second adjustment seat 3 by the second pivot portion 32. The first elastic member 4 and the second elastic member 6 are both folded wave-shaped structures. The first pivot portion 24 pivots about the support portion 11 through a pivot member 25. The second pivot portion 32 adjusts the laser beam 330 in the horizontal direction. The second adjustment portion 23 adjusts the laser beam 330 in the vertical direction. In the present embodiment, the pivot member 25 is a fixing screw which can be rotated.

The laser adjustment device C can be made by plastic having elasticity, such as polyformaldehyde (POM), polyamide 6 (PA6), polyamide 66 (PA 66), polypropylene (PP), polyethylene (PE), etc.

The second embodiment uses an integral one-body design and the elasticity of the plastic material of the first elastic member 4 and the second elastic member 6 replaces springs, such that the first elastic member 4 and the second elastic member 6 likewise have good effects of compression and decompression.

Third Embodiment

Figure 5:
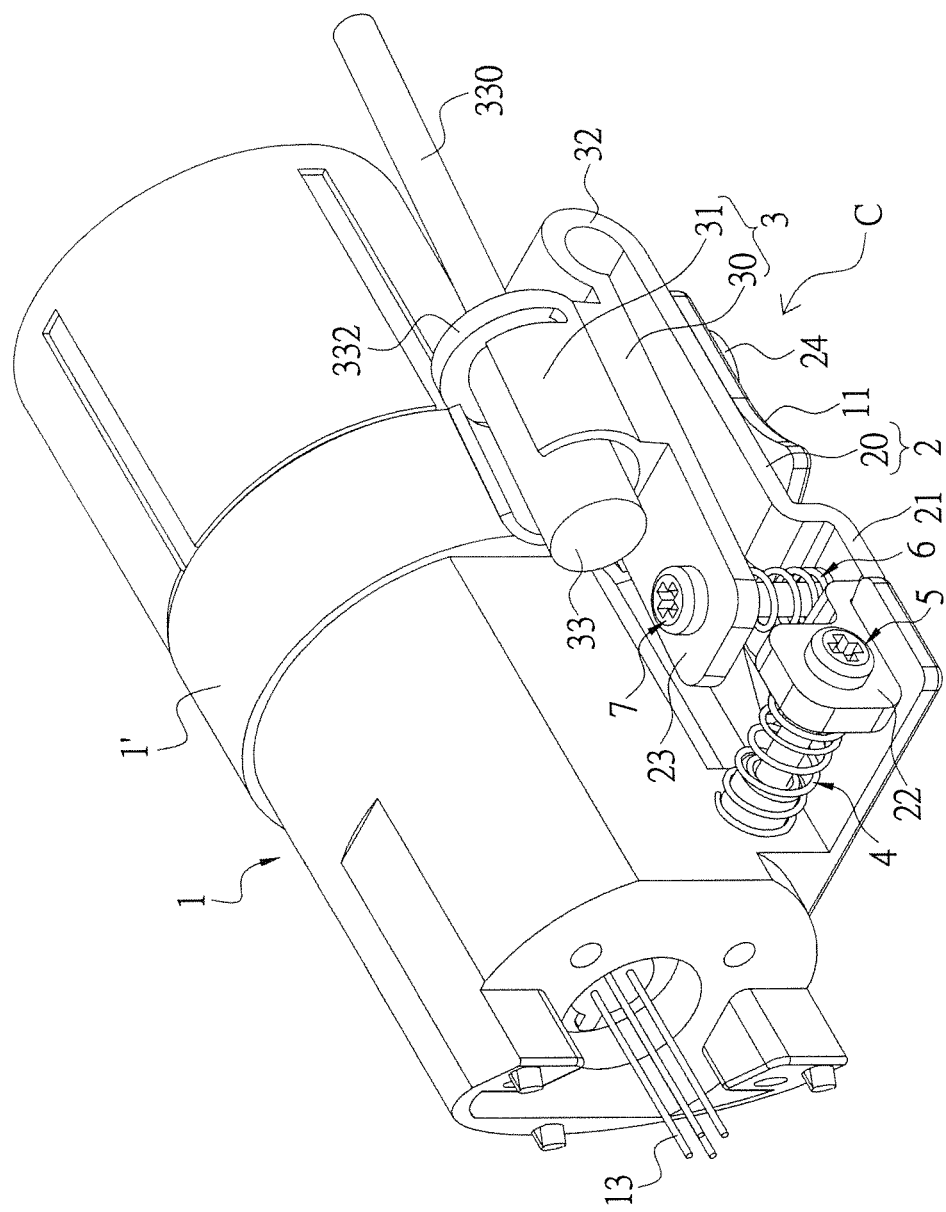
FIG. 5 is a perspective view of a third embodiment of the present disclosure.
Figure 6:
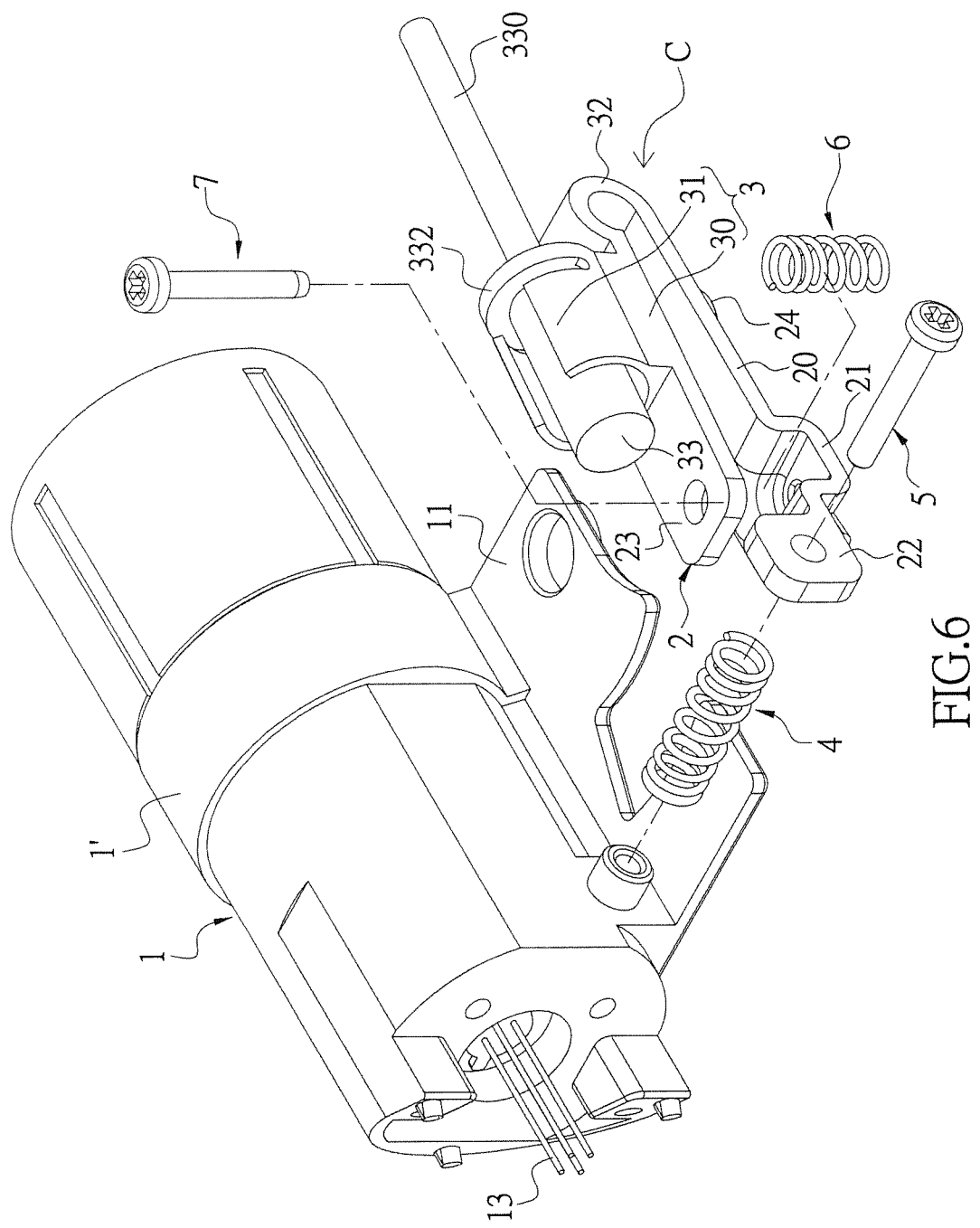
FIG. 6 is an exploded view of the third embodiment of the present disclosure.

FIG. 5 is a perspective view of a laser adjustment device C. FIG. 6 is an exploded view of the laser adjustment device C. Comparing FIG. 5 to FIG. 3, and FIG. 6 to FIG. 4, it can be seen that the second embodiment of the present disclosure provides a laser adjustment device C for an infrared thermometer 1. The laser adjustment device C includes a first adjustment seat 2 and a second adjustment seat 3.

The main difference between the third embodiment and the second embodiment is that in the third embodiment, the first adjustment seat 2 is connected to the second adjustment seat 3 through the second pivot portion 32, the first elastic member 4 and the second elastic member 6 are coil springs, and the first pivot portion 24 pivots about the support portion 11 through a pivot member 25. The support portion 11 extends from the surface 1' of the infrared thermometer 1 for supporting the laser adjustment device C. The second pivot portion 32 adjusts the laser beam 330 in the vertical direction. The second adjustment portion 23 adjusts the laser beam 330 in the horizontal direction. However, in the present embodiment, the pivot member 25 is a screw which can be rotated.

The first adjustment seat 2 and the second adjustment seat 3 are integrally formed as one body and the first elastic member 4 and the second elastic member 6 are coil springs, such that the coil springs replace the plastic wave-shaped structures and likewise have good effects of compression and decompression.

The Fourth Embodiment

Figure 7:
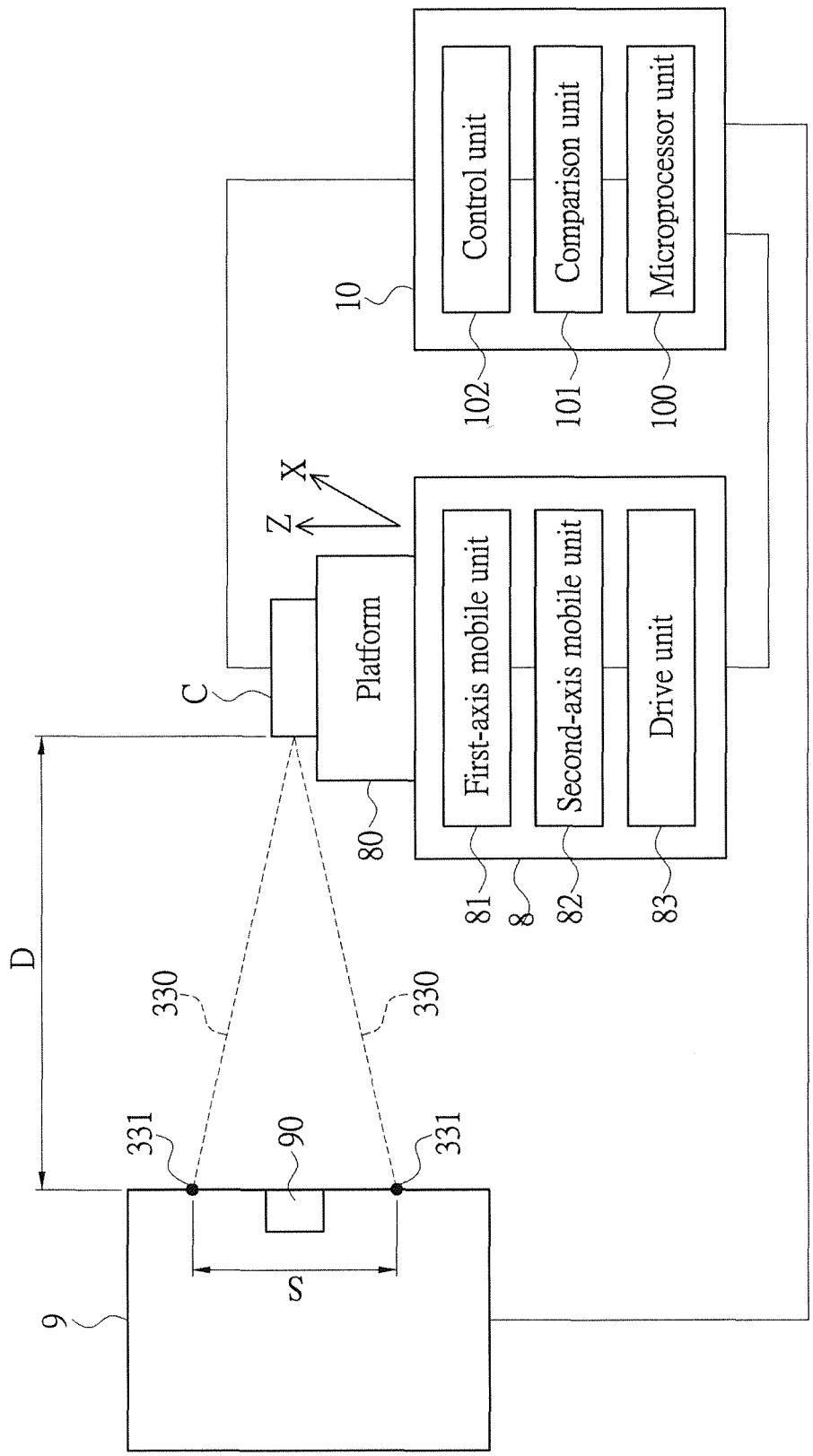
FIG. 7 is a schematic view of the system of a fourth embodiment of the present disclosure.

FIG. 7 is a schematic view of the system of the fourth embodiment of the present disclosure. The fourth embodiment of the present disclosure provides a laser adjustment system for an infrared thermometer 1, including: a working table 8, an infrared thermometer 1 and an electronic device 10. The infrared thermometer 1 is substantially similar to the infrared thermometer 1 of the first embodiment and therefore is not further described.

The working table has a platform 80, a first-axis mobile unit 81, a second-axis mobile unit 82, and a drive unit 83. The first-axis mobile unit 81 provides movement of the platform 80 in a first direction. The second-axis mobile unit 82 provides movement of the platform 80 in a second direction. The drive unit 83 drives the first-axis mobile unit 81 and the second-axis mobile unit 82. Specifically, the first direction is a horizontal direction (along the x-axis), and the second direction (along the z-axis) is the vertical direction perpendicular to the horizontal direction.

Then, the infrared thermometer 1 is disposed on the platform 80. The infrared thermometer 1 has an infrared temperature sensing unit 13, and at least one laser adjustment device C proximal to the infrared temperature sensing unit 13. Each of the laser adjustment devices C has a laser module 33. The laser module 33 has an emitting end 332 for emitting a laser beam 330. The infrared temperature sensing unit 13 is used for measuring temperature in a predetermined area on a target-image adjustment device 9 and obtains respective temperature data. Each of the laser modules 33 emits one laser beam 330 to the target-image adjustment device 9 forming a laser spot 331 and obtaining a respective position datum.

Since the sensing area of the infrared thermometer cannot be identified by the naked eye, the sensing area is called the FOV. The FOV is typically determined in the setting of the interior optics of the infrared thermometer, and each infrared thermometer 1 lists the value of its FOV. The infrared temperature sensing unit 13 and the target-image adjustment device 9 have a sensing distance D therebetween. The sensing area of the infrared temperature sensing unit has a sensing diameter S. The FOV is defined as the ratio of the sensing distance to the sensing diameter, typically represented by D:S. The infrared temperature sensing unit 13 is disposed in the infrared thermometer 1 and is proximal to the center of the end face of the infrared thermometer 1.

The electronic device 10 includes a microprocessor unit 100, a comparison unit 101, and a control unit 102. The control unit 102 and the target-image adjustment device 9 are connected. The electronic device 10 receives temperature data and through the microprocessor unit 100 directs the infrared thermometer 1 at the center of the heat source 90 and creates a sensing-area image (not shown in the figure) marking the sensing area. The electronic device 10 receives a position datum and through the microprocessor unit 100 creates a laser image marking the laser spot 331. The comparison unit 101 measures the distances between the sensing-area image and the laser spot 331 in the first direction and the second direction. The control unit 102 then adjusts the laser adjustment device C to the correct position.

It must be mentioned that in the present embodiment, the laser adjustment device C has a first adjustment seat 2 and a second adjustment seat 3, the first adjustment seat 2 adjusts the laser beam 330 in the vertical direction, the second adjustment seat 3 adjusts the laser beam 330 in the horizontal direction, and through the connection between the control unit 102 and the drive unit 83 the laser beam 33 can be quickly and precisely adjusted in the first direction (along the x-axis) and the second direction (along the y-axis).

Fifth Embodiment

Figure 8:
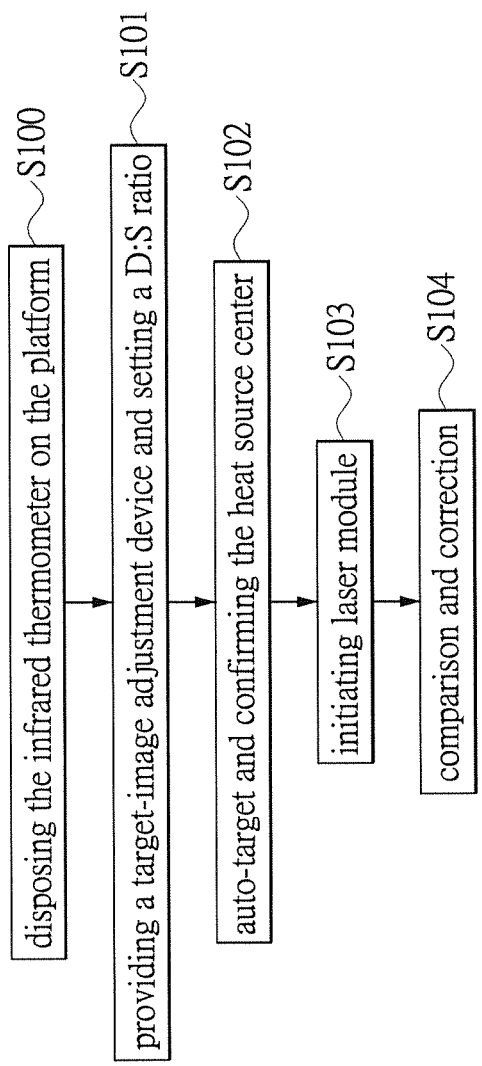
FIG. 8 is a flowchart of a fifth embodiment of the present disclosure.

FIG. 8 is a flowchart of a laser adjustment method. The fifth embodiment of the present disclosure provides a laser adjustment method for an infrared thermometer 1, including the following steps: S100, disposing the infrared thermometer 1 on the platform; S101, providing a target-image adjustment device 9 and setting a D:S ratio; S102, auto-target and confirming the heat source center 90; S103, initiating laser module; and S104, comparison and correction. The infrared thermometer 1 is substantially similar to the infrared thermometer 1 of the first embodiment and therefore is not further described.

First, in step S100, an infrared thermometer 1 is disposed on the platform 80: providing a working table 8 having a platform 80 movable in a first direction and a second direction, disposing on the platform 80 an infrared thermometer 1 which has an infrared temperature sensing unit 13, at least one laser adjustment device C proximal to the infrared temperature sensing unit 13, and a laser module 33 disposed on each of the laser adjustment device C.

Then, in step S101, a target-image adjustment device 9 is provided and the D:S ratio is set: providing a target-image adjustment device 9 to be measured by the infrared thermometer 1, wherein the infrared thermometer 1 and the target-image adjustment device 9 have a sensing distance D therebetween, the sensing area of the infrared temperature sensing unit 13 has a sensing diameter S; setting the sensing distance D to sensing diameter S ratio in an electronic device 10 having a microprocessor unit 100, a comparison unit 101, a control unit 103, and a target-image adjustment device 9, wherein the target-image adjustment device 9 and the control unit 102 are connected.

Then, in step S102 of auto-target and confirming the heat source center 90: initiating the infrared thermometer 1 and through the infrared temperature sensing unit 13 measuring the temperature in a predetermined area on the target-image adjustment device 9 and obtaining a plurality of corresponding temperature data, sending the temperature data obtained from measurement to the electronic device 10 and through the microprocessor unit 100 directing the infrared thermometer 1 at the heat source center 90 and creating a sensing-area image marking the sensing area on the target-image adjustment device 9, and sending the sensing-area image to the comparison unit 101.

Then, in step S103, the laser module 33 is initiated: initiating the laser module 33 to emit a laser beam 330 to the predetermined area forming a laser spot 331 and obtaining a corresponding position datum, sending the position datum to the electronic device 10 and through the microprocessor unit 100 creating a laser image marking the laser spot, and sending the laser image to the comparison unit 101.

Finally, in step S104 of comparison and correction: through the comparison unit 101 measuring the distances between the sensing-area image and the laser spot 331 in the first direction and the second direction, and through the control unit 102 quickly and precisely adjusting the first adjustment seat 2 and the second adjustment seat 3 of the laser adjustment device C such that the laser spot 331 is close to the sensing diameter S.

Potential Advantages of the Embodiments

In summary, an advantage of the present disclosure is that an embodiment of the present disclosure provides a laser adjustment device, a laser adjustment system and a laser adjustment method for an infrared thermometer, which through the design of "a first adjustment seat and a second adjustment seat", "the comparison unit measuring the distances between the sensing-area image and the laser spot in the first direction and the second direction, and through adjusting the laser adjustment device by the control unit," quickly and precisely adjust the laser module through the laser adjustment device to the correct position.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A laser adjustment device for an infrared thermometer, the infrared thermometer having a support portion and the laser adjustment device, comprising:
    a first adjustment seat having a base, a fixing portion connected to the base, a first adjustment portion connected to the base, a second adjustment portion connected to the base, and a first pivot portion connected to the base, wherein the fixing portion is disposed on the support portion, the first adjustment portion is proximal to the fixing portion, and the first pivot portion is pivotally connected to the support portion; and
    a second adjustment seat having a connecting portion connected to the base, a receiving portion extending from the connecting portion, a second pivot portion connected to the connecting portion, wherein the receiving portion accommodates a laser module, the laser module has an emitting end for emitting a laser beam, and the second pivot portion is connected to the first adjustment seat;
    wherein the first adjustment seat is pivoted about the first pivot portion by the first adjustment portion, a first elastic member disposed between the infrared thermometer and the first adjustment portion, and a first adjustment member passing through the first adjustment portion and connected to the infrared thermometer, and the second adjustment seat is pivoted about the second pivot portion by the second adjustment portion, a second elastic member connected to the base and the connecting portion, and a second adjustment member passing through the second adjustment portion and connected to the connecting portion.

2. The laser adjustment device according to claim 1, wherein the base includes a base seat and an extension portion connected to the base seat, the extension portion extends perpendicularly from the base seat in the direction away from the support portion, the extension portion has a top edge face, a first lateral edge face, a second lateral edge face opposite the first lateral edge face, and a lateral surface adjacent to the top edge face, the first lateral edge face and the second lateral edge face.

3. The laser adjustment device according to claim 2, wherein the fixing portion wraps around two ends of the support portion, the first adjustment portion is disposed on the lateral surface and is proximate to the second lateral edge face, the first adjustment portion extends from the lateral surface in the direction away from the laser module, the second adjustment portion is disposed on the top edge face, and the second adjustment portion extends from the top edge face in the direction away from the infrared thermometer.

4. The laser adjustment device according to claim 2, wherein the infrared thermometer has a fixing portion extending from a surface of the infrared thermometer, the base is disposed between the fixing portion and the support portion, and a protruding portion for fixing the connecting portion is disposed on the lateral surface proximate to the second lateral face.

5. The laser adjustment device according to claim 1, wherein the first adjustment seat adjusts the laser beam in the horizontal direction through the first adjustment portion, a first elastic member, and a first adjustment member, the second adjustment seat adjusts the laser beam in the vertical direction through the second adjustment portion, a second elastic member, and a second adjustment member.

6. The laser adjustment device according to claim 1, wherein the emitting end of the laser module has a prism for refracting a laser beam into a plurality of laser beams.

7. The laser adjustment device according to claim 1, wherein the first adjustment seat and the second adjustment seat are integrally formed as one body, the first adjustment seat is connected to the second adjustment seat through the second pivot portion, the first elastic member and the second elastic member are continuous folded wave-shaped structures, the first pivot portion is pivotally connected to the support portion through a pivot member, the second pivot portion is used for adjusting the laser beam in the horizontal direction, and the second adjustment portion adjusts the laser beam in the vertical direction.

8. The laser adjustment device according to claim 1, wherein the first adjustment seat and the second adjustment seat are integrally formed as one body, the first adjustment seat is connected to the second adjustment seat through the second pivot portion, the first elastic member and the second elastic member are coil springs, the first pivot portion is pivotally connected to the support portion through a pivot member, the second pivot portion is used for adjusting the laser beam in the vertical direction, and the second adjustment portion adjusts the laser beam in the horizontal direction.

* * * * *